US011862854B1

(12) United States Patent
Hassan et al.

(10) Patent No.: US 11,862,854 B1
(45) Date of Patent: Jan. 2, 2024

(54) DUAL-BAND ANTENNA ARRAYS AND METHODS OF FABRICATING THE SAME

(71) Applicants: Asif Hassan, Miami, FL (US); Elias Alwan, Miami, FL (US); Daniela Rodica Radu, Miami, FL (US); Cheng-Yu Lai, Miami, FL (US)

(72) Inventors: Asif Hassan, Miami, FL (US); Elias Alwan, Miami, FL (US); Daniela Rodica Radu, Miami, FL (US); Cheng-Yu Lai, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/316,680

(22) Filed: May 12, 2023

(51) Int. Cl.
*H01Q 19/00* (2006.01)
*H01Q 9/04* (2006.01)
*H01Q 1/24* (2006.01)

(52) U.S. Cl.
CPC ......... *H01Q 19/005* (2013.01); *H01Q 9/0407* (2013.01); *H01Q 1/247* (2013.01)

(58) Field of Classification Search
CPC ......... H01Q 1/38; H01Q 9/0407–0414; H01Q 19/005; H01Q 21/065
See application file for complete search history.

(56) References Cited

U.S. PATENT DOCUMENTS 11,539,139 B1 * 12/2022 Cheng ..................... H01P 3/006
2004/0183736 A1 * 9/2004 Sato ......................... H01Q 9/40 343/725
2013/0169503 A1 * 7/2013 Fakharzadeh Jahromi ................ H01Q 19/005 343/833
2019/0067834 A1 * 2/2019 Park ....................... H01Q 5/385
2023/0006349 A1 * 1/2023 Lee .......................... H01Q 9/40

* cited by examiner

*Primary Examiner* — Hasan Islam
(74) *Attorney, Agent, or Firm* — Saliwanchik, Lloyd & Eisenschenk

(57) ABSTRACT

Antenna arrays, antenna elements for said arrays, and methods of fabricating and using the same are provided. Antenna arrays can be operated at multiple frequencies, such as at two different frequencies for Radio Detection And Ranging (RADAR) communication and for imaging applications. Each antenna element can include a driven patch that is excited directly and a parasitic patch that is excited by the driven patch.

18 Claims, 7 Drawing Sheets

DUAL-BAND ANTENNA ARRAYS AND METHODS OF FABRICATING THE SAME

GOVERNMENT SUPPORT

This invention was made with government support under 80NSSC19K1674 awarded by the National Aeronautics and Space Administration. The government has certain rights in the invention.

BACKGROUND

An antenna array typically operates at a single frequency and can be used for, e.g., Radio Detection And Ranging (RADAR) communication or imaging applications. Antenna arrays are generally made by techniques such as photolithography or nanofabrication.

BRIEF SUMMARY

Embodiments of the subject invention provide novel and advantageous antenna arrays, antenna elements for said arrays, and methods of fabricating and using the same. Antenna arrays can be operated at multiple frequencies, such as at two different frequencies for Radio Detection And Ranging (RADAR) communication and for imaging applications. Each antenna element (e.g., each unit cell having a single antenna element) can include a driven patch that is excited directly and a parasitic patch that is excited by the driven patch. An antenna array (or each unit cell antenna element) can be fabricated using, e.g., a proto laser (such as a U4 proto laser).

In an embodiment, an antenna element can comprise: a substrate; a feeding source disposed on the substrate; a driven patch disposed on the substrate and electrically connected to the feeding source; and a parasitic patch disposed on the substrate and physically separated from the driven patch by a first gap. The driven patch can comprise a main patch and an inset feedline extending in a first direction from the main patch towards the feeding source. A length of the parasitic patch, taken in the first direction, can be smaller than a length of the driven patch, taken in the first direction. The driven patch can be disposed between, in the first direction, the feeding source and the parasitic patch. The antenna element can be a dual-band antenna element. The feeding source can comprise a coplanar waveguide (CPW) comprising a first source patch, a second source patch, and a source microstrip feedline. The source microstrip feedline can be electrically connected to the driven patch (e.g., by being physically connected to the inset feedline). The source microstrip feedline can be disposed between, in a second direction perpendicular to the first direction and parallel to an upper surface of the substrate, the first source patch and the second source patch. The source microstrip feedline can be physically separated from the first source patch by a second gap and physically separated from the second source patch by a third gap. The first source patch can comprise a first through hole and a first via filled in the first through hole, and/or the second source patch can comprise a second through hole and a second via filled in the second through hole. The antenna element can further comprise a bottom conductive layer disposed under the substrate, such that the substrate is disposed between the bottom conductive layer and the drive patch. The first via and/or the second via can each extend through the substrate and be electrically connected to the bottom conductive layer. The second gap can be equal (or about equal) in size to the third gap. The second gap and/or the third gap can each be smaller than the first gap. The first gap can be 10% or less (in distance) than the length of the parasitic patch, taken in the first direction. A width of the parasitic patch, taken in the second direction, can be larger than a width of the driven patch, taken in the second direction. The driven patch can further comprise: a first extension portion extending in the first direction from the main patch towards the feeding source, and being physically spaced apart from the feeding source; and a second extension portion extending in the first direction from the main patch towards the feeding source, and being physically spaced apart from the feeding source. The inset feedline can be physically spaced apart, in the second direction, from the first extension portion by a first inner cutout portion and from the second extension portion by a second inner cutout portion. The driven patch can further comprise: a first outer cutout portion on a first side thereof facing the feeding source; and a second outer cutout portion on the first side thereof. The inset feedline can be disposed between, in the second direction, the first outer cutout portion and the second outer cutout portion. An upper surface of the feeding source, an upper surface of the driven patch, and/or an upper surface of the parasitic patch can all be coplanar with each other. An upper surface of the first source patch and an upper surface of the second source patch can be coplanar with each other. The antenna element can be configured to operate at two frequencies at the W band (e.g., a first frequency of 78 gigahertz (GHz) and a second frequency of 94 GHz).

In another embodiment, an antenna array can comprise: a plurality of unit cell antenna elements, each unit cell antenna element being an antenna element as described herein (e.g., having any or all of the features described in the previous paragraph). The antenna array can be configured to operate at two frequencies at the W band (e.g., a first frequency of 78 GHz and a second frequency of 94 GHz). The feeding source of each unit cell antenna element can be electrically connected to the feeding source of each other unit cell antenna element, forming a feed network (e.g., a corporate feed network). For example, the source microstrip feedline of each unit cell antenna element can be physically connected with the source microstrip feedline of at least one other unit cell antenna element. The substrate of each unit cell antenna element can be shared with the substrate of every other unit cell antenna element, forming a single, monolithic substrate of the antenna array.

In another embodiment, a method of fabricating an antenna element can comprise: using a proto laser machine to fabricate a feeding source, a driven patch, and a parasitic patch on a substrate, the feeding source comprising two through holes extending therethrough; and performing extrusion plating with a conductive material (e.g., a metal material) to form two vias in the two through holes, respectively. The antenna element can be an antenna element as described herein (e.g., having any or all of the features described in the paragraph preceding the previous paragraph). The conductive material can be, for example, a metal paste (e.g., a metal paste comprising silver, gold, copper, aluminum, platinum, or similar).

2A lists values for certain dimensions, these are for exemplary purposes only and should not be construed as limiting.

Figure 1:
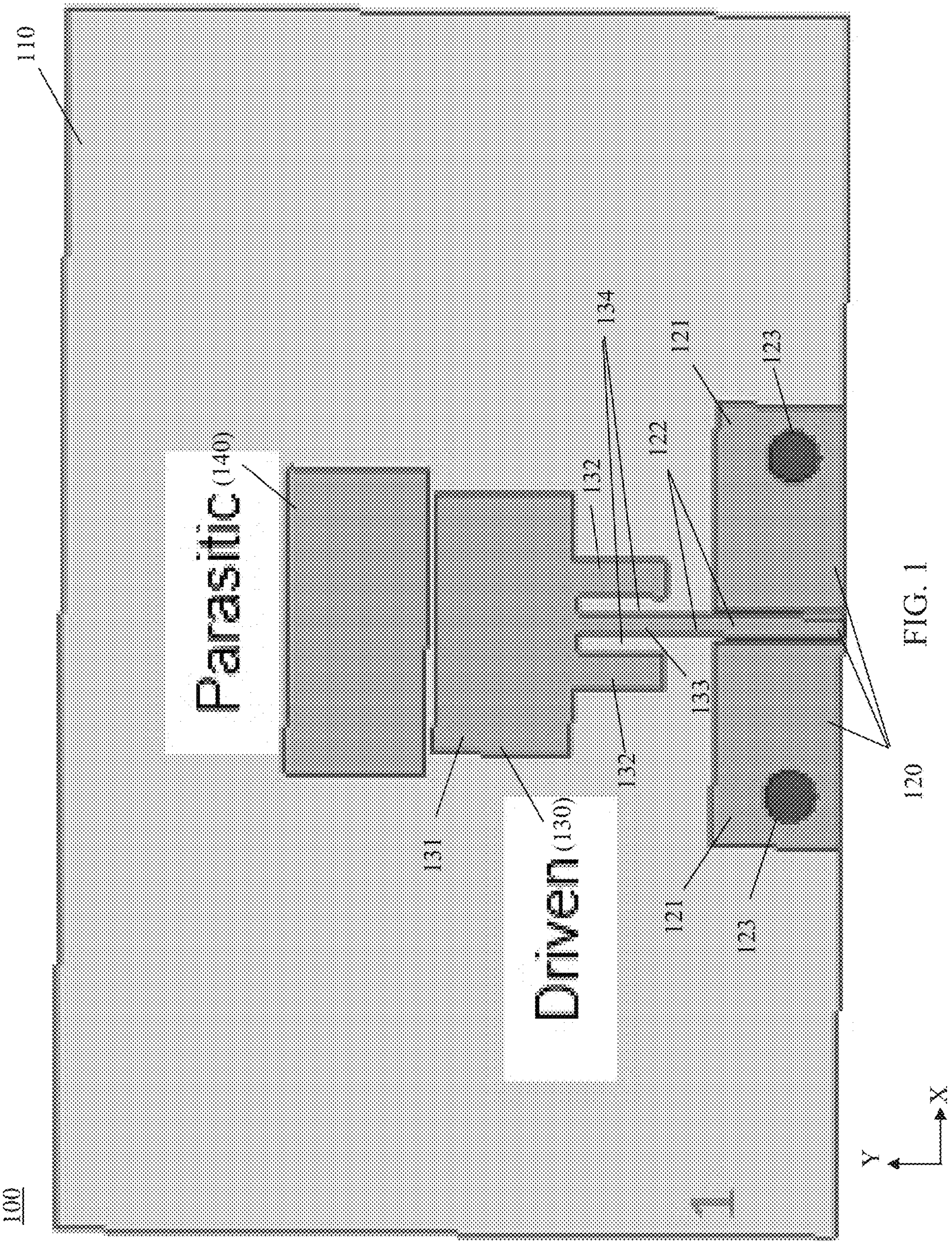
FIG. 1 shows a top view of an antenna element, according to an embodiment of the subject invention.
Figures 2A, 2B:
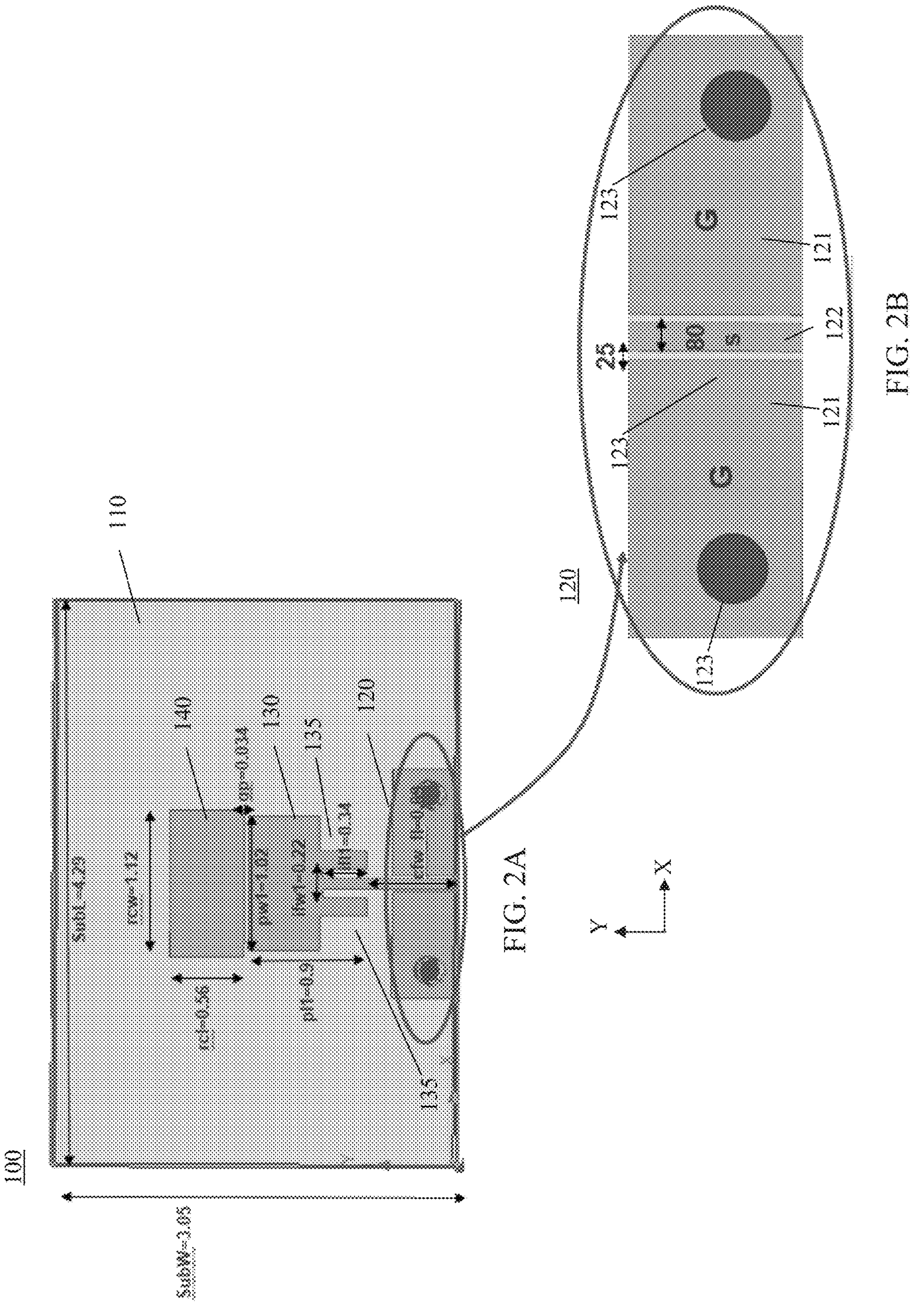
FIG. 2A shows a top view of an antenna element, according to an embodiment of the subject invention. Though FIG.

FIG. 2B shows an enlarged view of the coplanar waveguide (CPW) from FIG. 2A. Though FIG. 2B lists values for certain dimensions, these are for exemplary purposes only and should not be construed as limiting.

Figure 3:
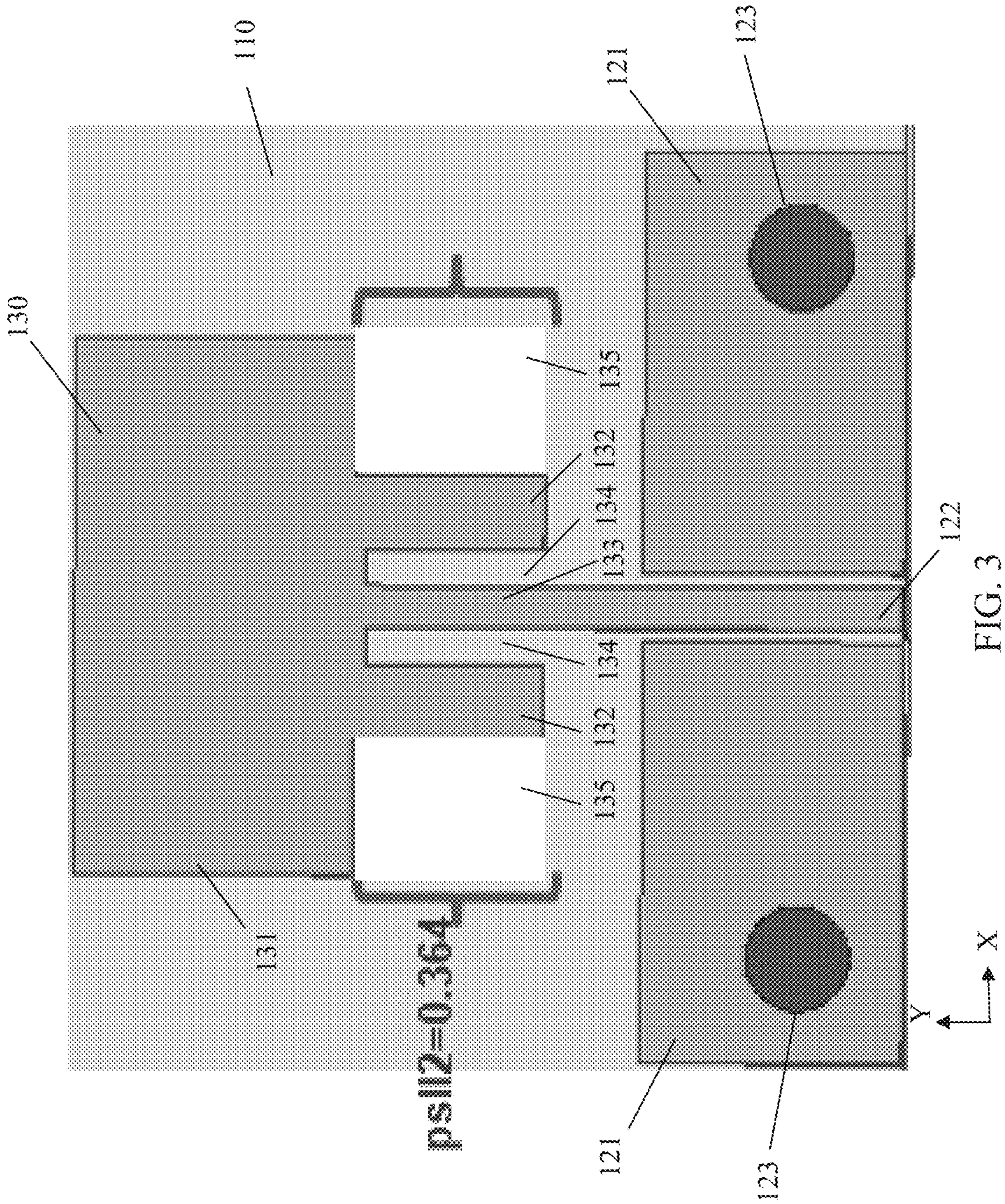

FIG. 3 shows a top view of an antenna element, according to an embodiment of the subject invention. Though FIG. 3 lists values for certain dimensions, these are for exemplary purposes only and should not be construed as limiting.

Figures 4A, 4B:
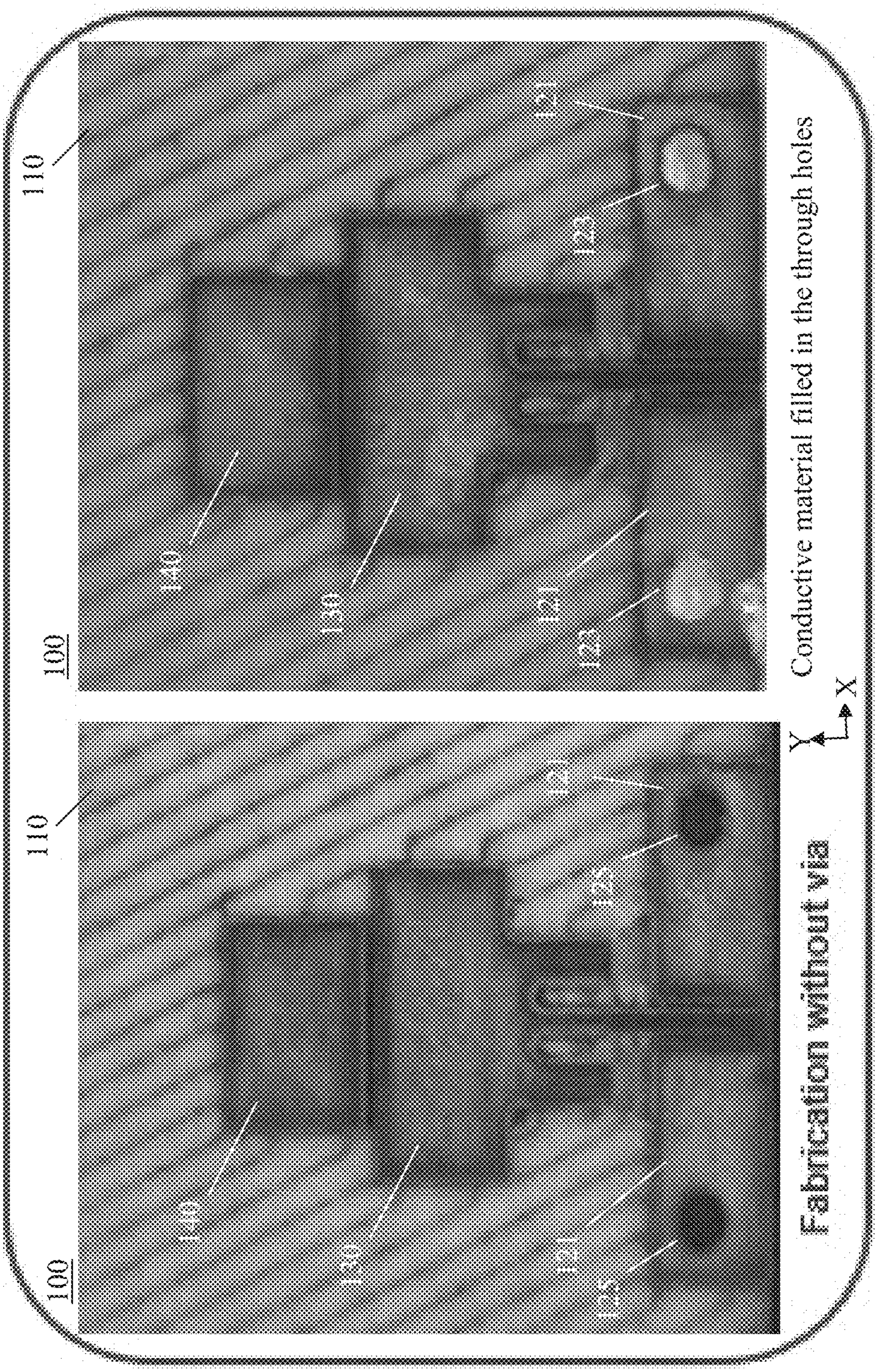

FIG. 4A shows an image of a top view of an antenna element, according to an embodiment of the subject invention. FIG. 4A shows the antenna element with through holes but without the vias filled in.

FIG. 4B shows an image of a top view of an antenna element, according to an embodiment of the subject invention. FIG. 4B shows the antenna element with a conductive material (for example, a metal material, such as a metal paste (e.g., silver (Ag) paste). filled in the through holes to form the vias.

Figure 5:
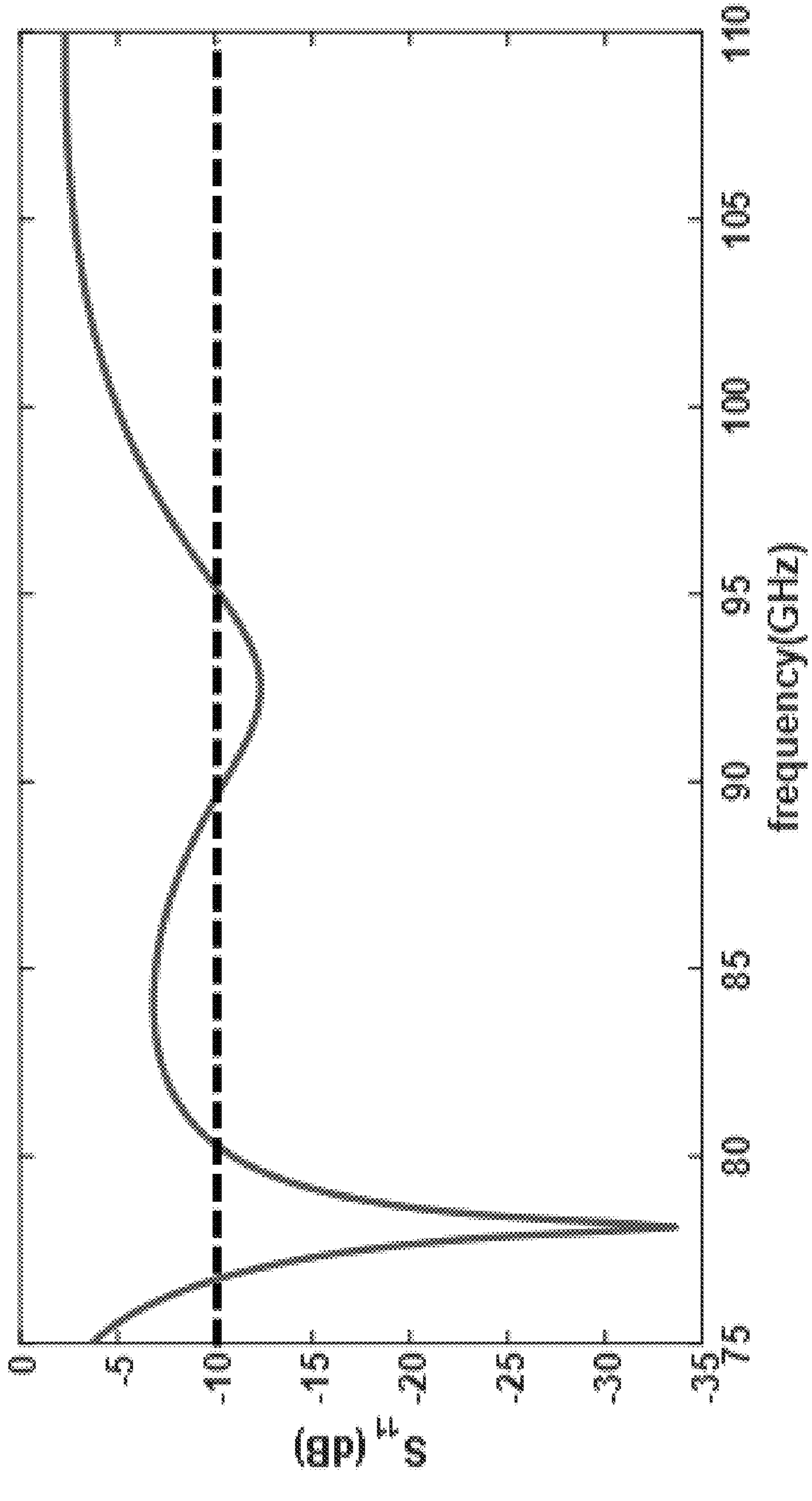

FIG. 5 shows a plot of reflection coefficient ($S_{11}$ (in decibels (dB)) versus frequency (in gigahertz (GHz)).

Figure 6:
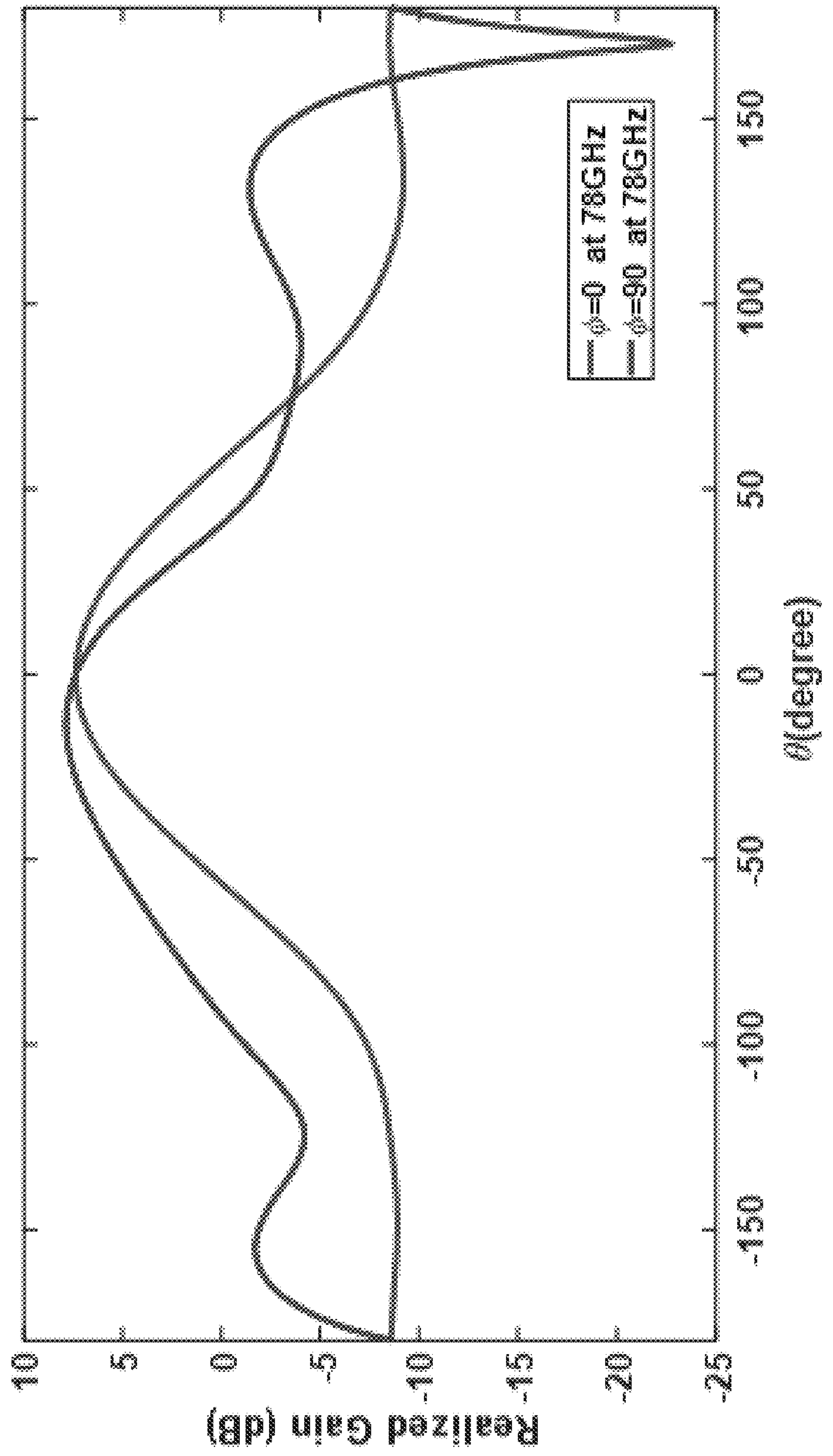

FIG. 6 shows a plot of realized gain (in dB) versus zenith angle (θ) of the antenna element (in degrees) at a frequency of 78 GHz, at different azimuthal angles (φ). The curve with the higher realized gain value at θ=+100 degrees is for φ=90 degrees; and the curve with the lower realized gain value at θ=+100 degrees is for φ=0 degrees.

Figure 7:
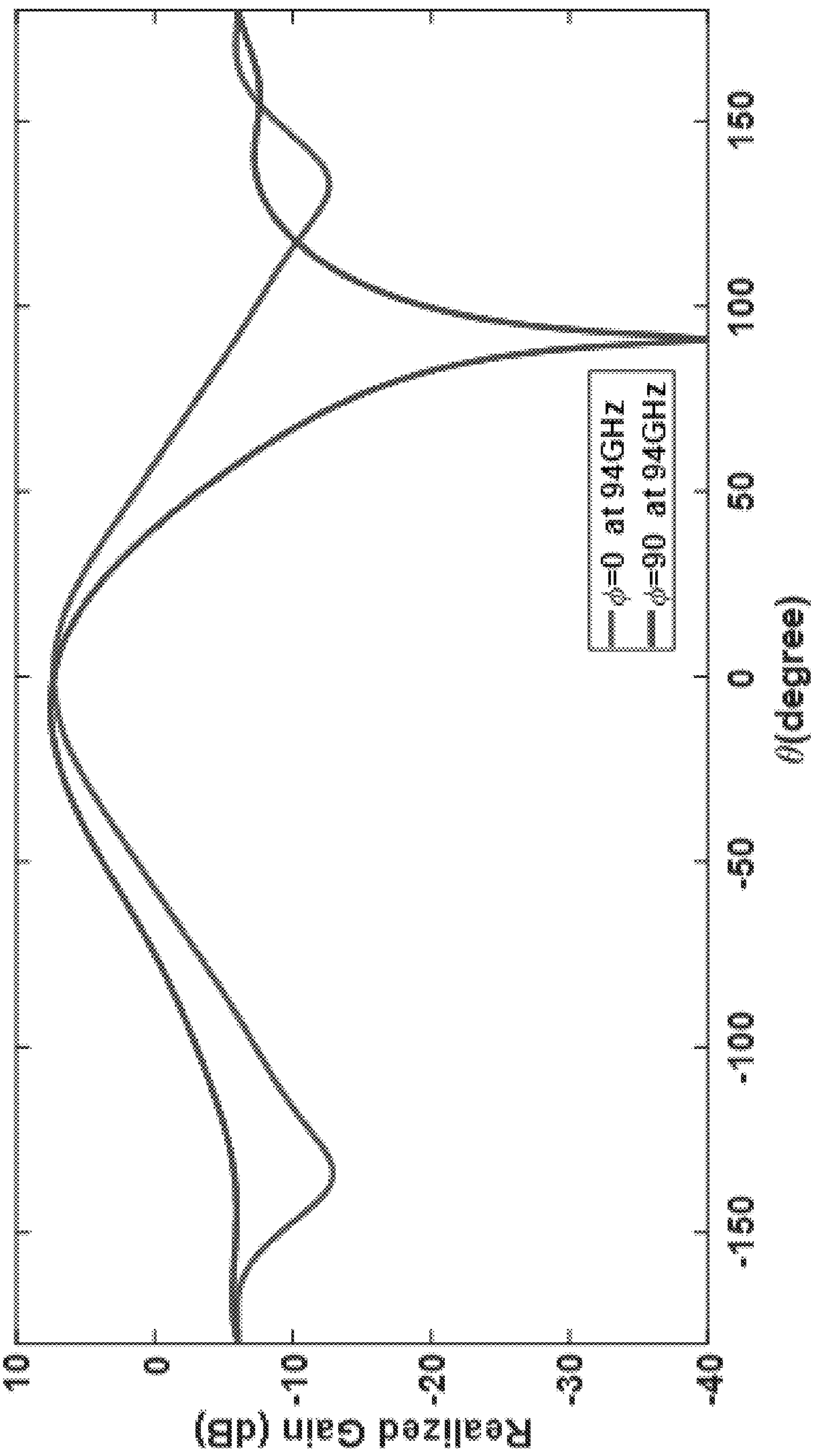

FIG. 7 shows a plot of realized gain (in dB) versus zenith angle (θ) of the antenna element (in degrees) at a frequency of 94 GHz, at different azimuthal angles (φ). The curve with the higher realized gain value at 0=+100 degrees is for φ=0 degrees; and the curve with the lower realized gain value at 0=+100 degrees is for φ=90 degrees.

DETAILED DESCRIPTION

Embodiments of the subject invention provide novel and advantageous antenna arrays, antenna elements for said arrays, and methods of fabricating and using the same. Antenna arrays can be operated at multiple frequencies, such as at two different frequencies for Radio Detection And Ranging (RADAR) communication and for imaging applications. Each antenna element (e.g., each unit cell having a single antenna element) can include a driven patch that is excited directly and a parasitic patch that is excited by the driven patch. Slots (e.g., gaps between conducive material) can be included to reduce the higher-order current in the parasitic patch.

FIGS. 1, 2A, 3, 4A, and 4B show top views of an antenna element, according to embodiments of the subject invention; and FIG. 2B shows an enlarged view of the feeding source. Though FIGS. 2A, 2B, and 3 list values for certain dimensions, these are for exemplary purposes only and should not be construed as limiting. Also, though the outer cutout portions 135 are depicted in FIG. 3 as white boxes, this is for emphasis only; the outer cutout portions 135 show where material of the driven patch 130 is absent, and the substrate 110 would be seen here (as depicted in FIGS. 1, 2A, 2B, 4A, and 4B). Referring to FIGS. 1-4B, an antenna element 100 (e.g., a unit cell having a single antenna or antenna element) can include a feeding source 120, a driven patch 130, and a parasitic patch 140 disposed on a substrate 110. The substrate 110 can be disposed on a bottom layer conductor. The bottom layer conductor can be, for example, a ground plane. The substrate 110 can be sandwiched between the bottom layer conductor and the top layer conductor (which includes the feeding source 120, the driven patch 130, and the parasitic patch 140).

The feeding source can be, for example, a coplanar waveguide (CPW)-based feeding source and can include a grounded CPW (GCPW). The GCPW can include two coplanar source patches 121 (i.e., the upper surface of each source patch 121 is in the same plane as the other source patch 121) and a source microstrip feedline 122. Each source patch 121 can include a grounded via 123, which can be formed in a through hole 125 through the respective source patch 121. The grounded via 123 can comprise a conductive material (for example, a metal (e.g., silver (Ag), aluminum (Al), copper (Cu), or similar), such as a metal paste). The grounded vias 123 can be electrically connected to the bottom layer conductor. Gaps (or slots) can be formed between the source microstrip feedline 122 and each source patch 121 (the gap between the microstrip feedline 122 and the leftmost source patch 121 is labeled in FIG. 2B as "25", showing that a possible width of the gap is 25 μm). The source microstrip feedline 122 and the source patches 121 can comprise a conductive material (for example, a metal (e.g., gold (Au), platinum (Pt), Ag, Al, Cu, or similar).

The driven patch 130 can include a main patch 131 and an inset feedline 133 (e.g., an inset microstrip feedline) connected directly to the main patch 131 and extending towards the feeding source 120 (e.g., in the y-direction as depicted in the figures). The main patch 131 can have, for example, a polygonal shape, such as a rectangular shape (in a cross-section taken parallel to the upper surface of the substrate 110 (i.e., in the x-y plane as depicted in the figures)). The driven patch 130 can be electrically connected to the feeding source 120, such as by direct physical connection between the inset feedline 133 and the source microstrip feedline 122. In some embodiments, the driven patch 130 can have two inner cutout portions 134 where material of the driven patch 130 is absent, thereby forming two extension portions 132 extending towards the feeding source 120 (e.g., in the y-direction as depicted in the figures) but physically separated from the feeding source 120. The driven patch 130 can further include two outer cutout portions 135 where material of the driven patch 130 is absent, thereby resulting in the extension portions 132 being thinner and conserving material of the driven patch 130. Though the outer cutout portions 135 are depicted in FIG. 3 as white boxes, this is for emphasis only; the outer cutout portions 135 show where material of the driven patch 130 is absent, and the substrate 110 would be seen here (as depicted in FIGS. 1, 2A, 2B, 4A, and 4B). The inset feedline 133 and the extension portions 132 can each have, for example, a polygonal shape, such as a rectangular shape (in the x-y plane as depicted in the figures). The main patch 131, the inset feedline 133, and the extension portions 132 can comprise a conductive material (for example, a metal (e.g., Au, Pt, Ag, Al, Cu, or similar). The inner cutout portion(s) 134 is/are included for inset feed and to reduce the coupling on both sides of inset feedline 133.

The parasitic patch 140 can be disposed on an opposite side of the driven patch 130 as the feeding source 120 is. That is, the parasitic patch 140 can be disposed on a side of the driven patch 130 having the radiating edge (of the driven patch 130). The parasitic patch 140 can be physically separated from the driven patch 130 by a gap (labeled "gp" in FIG. 2A). The gap gp can be much smaller than a smallest width of the parasitic patch 140 in the x-y plane (e.g., the gap gp can be less than 10% as large as the width of the parasitic patch 140 in the y-direction as depicted in the figures). The parasitic patch 140 can have a smaller length (in the y-direction as depicted in the figures) than the driven patch 130 does.

At least two of the respective upper surfaces of the driven patch 130, the parasitic patch 140, the source microstrip feedline 122, and the source patches 121 can be disposed in the same plane as each other. In some embodiments, all of the respective upper surfaces of the driven patch 130, the parasitic patch 140, the source microstrip feedline 122, and the source patches 121 can be disposed in the same plane as each other.

In an embodiment, any antenna element (e.g., unit cell having a single antenna element) (e.g., a unit cell comprising a single antenna element) or an entire antenna array can be fabricated using a proto laser (e.g., a U4 proto laser machine). Compared to related art techniques (e.g., photolithography and nanofabrication), which require a lot of wait time to fabricate a small volume, a proto laser is much faster. An extrusion plating method (e.g., a low-cost extrusion plating method) can be used to plate the via 123.

The dual-band tuning can be implemented using a parasitic patch excitation technique. The driven patch can be excited directly (by the feeding source), and the parasitic patch 140 can be excited by driven patch 130. Gaps can be included to reduce the higher-order current in the parasitic patch 140. The gaps can include, for example, a first gap between the parasitic patch 140 and the driven patch 130 (labeled "gp" in FIG. 2A), a second gap between the source microstrip feedline 122 and one of the source patches 121 (see also the "25" label in FIG. 2B), and a third gap between the source microstrip feedline 122 and the other source patch 121). The antenna array can be used at two different frequencies at the W band.

An antenna array can comprise an array of antenna elements, where each antenna element is as described herein (see also FIGS. 1-4B). The antenna array can include a corporate feed network to excite multiple dual-band antenna elements of the antenna array (e.g., all antenna elements of the antenna array). A corporate feeding network equally splits the power at each junction of the antenna array for uniform distribution. The array feeding network can all be disposed on the same plane, making the overall structure more compact (particularly in the thickness direction (perpendicular to the x-y plane depicted in the figures).

In some embodiments, the antenna array may have a single substrate that is shared by all antenna elements. The antenna array may also have a single bottom conductor that is shared by all antenna elements. The respective feeding sources 120 of the antenna elements 100 can all be electrically connected to each other (e.g., the respective the source microstrip feedlines 122 of the antenna elements 100 can all be electrically connected to each other). For example, the source microstrip feedline 122 of each antenna element 100 can be physically connected to the source microstrip feedline 122 of at least one other antenna element 100 of the antenna array.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

A single antenna element as depicted in FIGS. 2A-4B was fabricated. A single substrate (material=Rogers 3003) having a thickness of 0.25 millimeters (mm) was used, and the substrate was sandwiched between the top layer conductor (including the feed source, the driven patch, and the parasitic patch) and the bottom layer conductor. The substrate had a length SubW (in the y-direction) and width SubL (in the x-direction) of 3.05 mm and 4.29 mm, respectively. The top layer conductor was a single dual-band antenna with a GCPW based feeding source. The dual-band antenna operated at 78 GHz and 94 GHz. The corporate feed network was optimized for 78 GHz and 94 GHz. The GCPW configuration was used, where a width of the source microstrip feedline was 80 micrometers (μm), and the gap between the source microstrip feedline and each source patch was 25 μm (see also FIG. 2B). The diameter of each ground via in the GCPW was 0.2 mm. In order to simulate the design, AnSys high-frequency structure simulator (HFSS) was used.

Referring to FIG. 2A, the length pl1 (in the y-direction as depicted in the figures) and width pw1 (in the x-direction) of the driven patch were 0.91 mm and 1.02 mm, respectively. The length ifl1 (in the y-direction) of the inset feedline was 0.34 mm, and the width ifw1 (in the x-direction) between the extension portions was 0.22 mm. The length cpw_fl (in the y-direction) of the source microstrip feedline was 0.69 mm. The length rcl (in the y-direction) and width rcw (in the x-direction) of the parasitic patch were 0.56 mm and 1.12 mm, respectively. The gap gp (in the y-direction) between the parasitic patch and the driven patch was 34 Referring to FIG. 3, the length psl12 (in the y-direction) of each outer cutout portion was 0.364 mm.

The GCPW was aligned to a ground-signal-ground (GSG) probe of an anechoic chamber to measure the radiation pattern of the antenna. The size of the GCPW was chosen due to the fixed GSG probe dimension so that it could measure the antenna pattern properly. The input impedance at the driven patch was calculated as 73 Ohms (Ω). The planar dual-band antenna was implemented at the frequencies of 78 GHz and 94 GHz in order to be useful for RADAR communication and imaging applications.

At 78 GHz, the driven patch radiates but, due to its smaller length (compared to the driven patch), the parasitic patch does not contribute to the radiation. At 94 GHz, the radiation pattern is directional. The driven patch contributes to generating the higher order mode. The corners of the driven patch are cut out close to the inset feedline (to give the outer cutout portions) in order to reduce the higher order mode.

The minimum trace size in the antenna element was 25 so it is very difficult to find processes in the art capable of such a small trace. The antenna element was fabricated using a U4 proto laser machine at Florida International University (FIU) in Miami, FL. A template for thick Rogers 3003 substrate was optimized. In order to do this, the laser power, frequency, overlay speed, and cut repetition is optimized. After fabricating the antenna element including the through holes in the source patches, the vias were formed. Via plating methods (e.g., using a plating machine such as a Leiterplatten-Kopierfrasen (LPKF) machine) can be expensive, and with the through hole diameter being 0.2 mm, they were difficult to see with the naked eye. The via filling process was done under a microscope machine using Ag paste by an extrusion method (see also FIGS. 4A and 4B). The via filling process was performed in the mechanical department at FIU.

A simulation was run on the antenna element to simulate its reflection coefficient ($S_{11}$) across different frequencies and to determine its realized gain at different zenith angles (θ). The realized gain was determined at azimuthal angles (φ) of 0 degrees and 90 degrees for frequencies of 78 GHz and 94 GHz.

Referring to FIGS. 5-7, the antenna element showed good performance in reflection coefficient and radiation gain at 78 GHz and 94 GHz. The bandwidths achieved around 78 GHz and 94 GHz were about 5.0 GHz and 9 GHz, respectively. The return loss had minimum values of −41 dB and −11 dB at 78 GHz and 94 GHz, respectively (FIG. 5). The maximum gain was 7.3 decibels relative to isotropic (dBi) and 7.3 dBi at 78 GHz and 94 GHz, respectively (FIGS. 6 and 7).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An antenna element, comprising:

a substrate;

a feeding source disposed on the substrate;

a driven patch disposed on the substrate and electrically connected to the feeding source; and a parasitic patch disposed on the substrate and physically separated from the driven patch by a first gap, wherein the driven patch comprises a main patch and an inset feedline extending in a first direction from the main patch towards the feeding source, wherein a length of the parasitic patch, taken in the first direction, is smaller than a length of the driven patch, taken in the first direction, wherein the driven patch is disposed between, in the first direction, the feeding source and the parasitic patch, wherein the feeding source comprises a coplanar waveguide (CPW) including a first source patch, a second source patch, and a microstrip feedline disposed between the first source patch and the second source patch, and wherein the antenna element is a dual-band antenna element for operation at a first frequency of 78 gigahertz (GHz) and a second frequency of 94 GHz.

2. The antenna element according to claim 1, wherein the source microstrip feedline is electrically connected to the driven patch, wherein the source microstrip feedline is disposed between, in a second direction perpendicular to the first direction and parallel to an upper surface of the substrate, the first source patch and the second source patch, and wherein the source microstrip feedline is physically separated from the first source patch by a second gap and physically separated from the second source patch by a third gap.

3. The antenna element according to claim 2, wherein the first source patch comprises a first through hole and a first via filled in the first through hole, and wherein the second source patch comprises a second through hole and a second via filled in the second through hole.

4. The antenna element according to claim 3, further comprising a bottom conductive layer disposed under the substrate, such that the substrate is disposed between the bottom conductive layer and the drive patch, and wherein the first via and the second via each extends through the substrate and is electrically connected to the bottom conductive layer.

5. The antenna element according to claim 2, wherein the second gap and the third gap is each smaller than the first gap.

6. The antenna element according to claim 1, wherein the first gap is 10% or less than the length of the parasitic patch, taken in the first direction.

7. The antenna element according to claim 1, wherein a width of the parasitic patch, taken in a second direction perpendicular to the first direction and parallel to an upper surface of the substrate, is larger than a width of the driven patch, taken in the second direction.

8. The antenna element according to claim 1, wherein the driven patch further comprises:

a first extension portion extending in the first direction from the main patch towards the feeding source, and being physically spaced apart from the feeding source; and a second extension portion extending in the first direction from the main patch towards the feeding source, and being physically spaced apart from the feeding source, wherein the inset feedline is physically spaced apart, in a second direction perpendicular to the first direction and parallel to an upper surface of the substrate, from the first extension portion by a first inner cutout portion and from the second extension portion by a second inner cutout portion.

9. The antenna element according to claim 1, wherein the driven patch further comprises:

a first outer cutout portion on a first side thereof facing the feeding source; and a second outer cutout portion on the first side thereof, wherein the inset feedline is disposed between, in a second direction perpendicular to the first direction and parallel to an upper surface of the substrate, the first outer cutout portion and the second outer cutout portion.

10. The antenna element according to claim 1, wherein an upper surface of the feeding source, an upper surface of the driven patch, and an upper surface of the parasitic patch are all coplanar with each other.

11. An antenna array, comprising:

a plurality of unit cell antenna elements, each unit cell antenna element being an antenna element according to claim 1, wherein the antenna array is configured to operate at first frequency of 78 GHz and the second frequency of 94 GHz.

12. The antenna array according to claim 11, wherein the feeding source of each unit cell antenna element is electrically connected to the feeding source of each other unit cell antenna element, forming a feed network.

13. The antenna array according to claim 12, wherein the feed network is a corporate feed network.

14. The antenna array according to claim 11, wherein the substrate of each unit cell antenna element is shared with the substrate of every other unit cell antenna element, forming a single, monolithic substrate of the antenna array.

15. A method of fabricating an antenna element, the method comprising:

using a proto laser machine to fabricate a feeding source, a driven patch, and a parasitic patch on a substrate, the feeding source comprising two through holes extending therethrough; and performing extrusion plating with a metal material to form two vias in the two through holes, respectively;

the driven patch being electrically connected to the feeding source, the parasitic patch being physically separated from the driven patch by a first gap, the feeding source comprising a coplanar waveguide (CPW) including a first source patch, a second source patch, and a microstrip feedline disposed between the first source patch and the second source patch, the driven patch comprising a main patch and an inset feedline extending in a first direction from the main patch towards the feeding source, a length of the parasitic patch, taken in the first direction, being smaller than a length of the driven patch, taken in the first direction, and the driven patch being disposed between, in the first direction, the feeding source and the parasitic patch;

wherein the antenna element is a dual-band antenna element for operation at a first frequency of 78 gigahertz (GHz) and a second frequency of 94 GHz.

16. The method according to claim 15, wherein the metal material is a metal paste comprising silver, gold, copper, aluminum, or platinum.

17. An antenna element, comprising:

a substrate;

a feeding source disposed on the substrate;

a driven patch disposed on the substrate and electrically connected to the feeding source;

a parasitic patch disposed on the substrate and physically separated from the driven patch by a first gap; and a bottom conductive layer disposed under the substrate, such that the substrate is disposed between the bottom conductive layer and the driven patch;

wherein the driven patch comprises:

a main patch;

an inset feedline extending in a first direction from the main patch towards the feeding source;

a first extension portion extending in the first direction from the main patch towards the feeding source, and being physically spaced apart from the feeding source;

a second extension portion extending in the first direction from the main patch towards the feeding source, and being physically spaced apart from the feeding source;

a first outer cutout portion on a first side thereof facing the feeding source; and a second outer cutout portion on the first side thereof;

the inset feedline being physically spaced apart, in a second direction perpendicular to the first direction and parallel to an upper surface of the substrate, from the first extension portion by a first inner cutout portion and from the second extension portion by a second inner cutout portion, the inset feedline being disposed between, in the second direction, the first outer cutout portion and the second outer cutout portion;

wherein a length of the parasitic patch, taken in the first direction, is smaller than a length of the driven patch, taken in the first direction, the driven patch being disposed between, in the first direction, the feeding source and the parasitic patch;

wherein the feeding source comprising a coplanar waveguide (CPW) comprises a first source patch, a second source patch, and a source microstrip feedline, the source microstrip feedline being electrically connected to the driven patch, the source microstrip feedline being disposed between, in the second direction, the first source patch and the second source patch, the source microstrip feedline being physically separated from the first source patch by a second gap and physically separated from the second source patch by a third gap, the first source patch comprising a first through hole and a first via filled in the first through hole, the second source patch comprising a second through hole and a second via filled in the second through hole, the first via and the second via each extending through the substrate and being electrically connected to the bottom conductive layer, the second gap and the third gap each being smaller than the first gap;

wherein the first gap is 10% or less than the length of the parasitic patch, taken in the first direction, a width of the parasitic patch, taken in the second direction perpendicular to the first direction and parallel to the upper surface of the substrate, being larger than a width of the driven patch, taken in the second direction, a first upper surface of the first source patch and second upper surface of the second source patch being coplanar with each other, and wherein the antenna element is a dual band antenna for operation at a first frequency of 78 gigahertz (GHz) and a second frequency of 94 GHz.

18. An antenna array, comprising:

a plurality of unit cell antenna elements, each unit cell antenna element being an antenna element according to claim 17, wherein the antenna array is configured to operate at the first frequency of 78 GHz and the second frequency of 94 GHz, wherein the feeding source of each unit cell antenna element is electrically connected to the feeding source of each other unit cell antenna element, forming a feed network, and wherein the feed network is a corporate feed network.

* * * * *